(No Model.)

J. M. COHN.
CORSET CLASP.

No. 310,797. Patented Jan. 13, 1885.

Witnesses.
J. P. Shumway
Jos. C. Earle

Julius M. Cohn
Inventor
By atty.

UNITED STATES PATENT OFFICE.

JULIUS M. COHN, OF NEW YORK, N. Y.

CORSET-CLASP.

SPECIFICATION forming part of Letters Patent No. 310,797, dated January 13, 1885.

Application filed June 18, 1884. (No model.)

*To all whom it may concern:*

Be it known that I, JULIUS M. COHN, of New York, in the county of New York and State of New York, have invented new Improvements in Corset-Clasp Eyes; and I do hereby declare the following, when taken in connection with accompanying drawings and the letters of reference marked thereon, to be a full, clear, and exact description of the same, and which said drawings constitute part of this specification, and represent, in—

Figure 1:
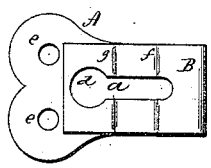
Figure 2:
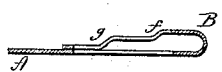
Figure 3:
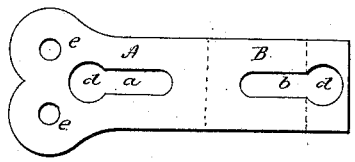
Figure 4:
Figure 5:
Figure 7:
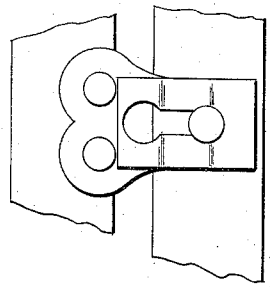
Figure 6:
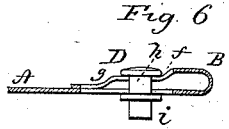

Figure 1, a face view of the eye complete; Fig. 2, an edge view of the eye; Fig. 3, the blank as cut to form the body and spring of the eye; Fig. 4, a modification of the spring; Fig. 5, a side view of the stud; Fig. 6, a side view showing the eye and stud as set together; Fig. 7, the two busks, the eye applied to one and the stud to the other.

This invention relates to an improvement in that class of corset-clasps which consist of a pair of steel springs or busks, to one of which headed studs are applied and to the other eyes, in which is provided a slot corresponding to the body of the stud, the end of the slot next the busk, to which the eye is attached, enlarged so as to pass over the head of the stud—a clasp of common and well-known construction.

The object of my invention is to construct the clasp so that when the corset is clasped upon the body the clasps may not be accidentally detached, thereby overcoming a difficulty in this class of clasps; and the invention consists in an eye, such as above described, having an extension from its outer end turned back upon the eye in the form of a spring, inclining from its outer end downward upon the eye near the busk, with a slot corresponding to the slot in the eye, and so that the headed stud introduced into the eye and drawn into the slot will compress the spring and produce sufficient friction to prevent its accidental return, as more fully hereinafter described. The eye in general outline is the same as the common clasp-eye, and as seen in Fig. 1, and is cut from sheet metal having a certain degree of elasticity; but, instead of making the eye only of sufficient length to permit of the single slot *a*, I extend the metal from the outer end, and form therein a reverse slot, *b*, substantially like the slot *a*, the slot *a* being substantially the usual slot, having an enlarged opening, *d*, near the busk end. Thus cut, the part in which is the slot *b* is doubled back upon the part in which is the slot *a*, but not closed thereon at the outer end, the inner end, however, turned down upon the surface of the eye, as seen in Fig. 2. Thus applied the lower part, A, forms the body of the clasp-eye, and the upper part, B, the spring. The part A is pierced, as at *e*, for the introduction of rivets to secure it to the busk. The part B may be offset at different points, as at *f g*, the portion between the offsets being substantially parallel with the body A, as seen in Fig. 2, or it may be gradually inclined until its tip end bears upon the body A, as seen in Fig. 4.

The stud D, as seen in Fig. 5, is constructed with an annular groove, *h*, and with a shank, *i*, by which it is secured to its busk. The body of the stud in the groove *h* corresponds to the width of the narrower portion of the slot *a*. The outer or head end is larger than the slot *a*, but less in diameter than the large part *d* of the slot, and so as to pass through that enlarged part *d*, substantially as does the stud in clasps of common construction. The length of the groove *h* is less than the extreme thickness of the two parts of the eye, and so that after the stud has been introduced through the opening *d* and drawn into the eye the spring part B will be compressed within the groove *h*, and toward the body A of the clasp, as seen in Fig. 6, the spring B making strong frictional contact with the under side of the head in the groove, and the body A corresponding frictional contact with the opposite side of the groove, this frictional contact being sufficient to prevent the accidental return of the stud when once drawn to a bearing in the slot. The offsets *f g* are slight, but so that the head may be drawn, say, upon the first offset, *g*, and there held; but under greater strain the head will pass onto the next offset, or still greater onto the next, if there be so many. By making the several offsets and each offset substantially parallel with the under surface of the body A of the eye a greater extent of bearing in the groove of the stud is attained than when the spring is simply inclined, as seen in Fig. 6. The simple inclined spring, however, accomplishes the object of the invention. The cost of the eye is very little more than that of the common eye, and the locking device is such as to require no instructions or more intelligence on the part of the user than that of the common clasp-eye. It avoids the lock-like engagement, which is employed in many cases, and which is a source of annoyance to the wearer.

While I prefer to make the spring portion $b$ of the clasp to extend beyond the enlarged portion $d$ of the slot, it may be shorter, as indicated in broken lines, Fig. 3. In any case that end of the spring is left free upon the surface of the body of the eye and so as to move thereon under the pressure applied to the spring.

I prefer to use the stud which I have described in connection with my improved clasp-eye; but it may be used in connection with studs of common construction, the eye being applied thereto in the usual manner, the body of the eye itself taking its bearing upon the fabric of the corset and the spring upon the under side of the head.

The eye is applied to one busk and the stud to the other in the usual manner, and as seen in Fig. 7.

I claim—

1. The herein-described improvement in corset-clasps, consisting of the eye composed of a body, A, constructed with a slot, $a$, having an enlarged opening, $d$, near the busk end of the eye, the outer end extended, and a corresponding slot made in said extension, the extension turned backward over the body A to form a spring, B, the slot and enlarged opening in the spring portion corresponding to the slot and opening in the body of the eye, substantially as described.

2. A clasp-eye having the body A and the spring B formed in one and the same piece, the spring turned over and upon the surface of the eye, the body and spring constructed with a corresponding slot for the introduction of the head of the stud, and the spring constructed with the offsets $f$ $g$, more or less in number, substantially as described.

3. The herein-described improvement in corset-clasps, consisting of the eye composed of a body, A, constructed with a slot, $a$, having an opening, $d$, near the busk end of the eye, the outer end extended, and a corresponding slot made in said extension, the extension turned backward over the body A to form a spring, B, the slot in the spring portion corresponding to the slot in the body of the eye, combined with a stud constructed with an annular groove, $h$, the diameter of the stud in the groove corresponding substantially to the slot in the eye, and substantially as described.

JULIUS M. COHN.

Witnesses:
MICHAEL WALLSTEIN,
HENRY J. SCHUMANN.